(12) United States Patent
Schallmo et al.

(10) Patent No.: US 9,796,261 B2
(45) Date of Patent: Oct. 24, 2017

(54) LIQUID/VAPOR SEPARATOR

(71) Applicant: Kautex Textron GmbH & Co. KG, Bonn (DE)

(72) Inventors: Dominik Schallmo, Bonn (DE); Gernot Weiss, Neunkirchen (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 120 days.

(21) Appl. No.: 14/442,350

(22) PCT Filed: Nov. 14, 2013

(86) PCT No.: PCT/EP2013/073811
§ 371 (c)(1),
(2) Date: May 12, 2015

(87) PCT Pub. No.: WO2014/076173
PCT Pub. Date: May 22, 2014

(65) Prior Publication Data
US 2016/0272061 A1    Sep. 22, 2016

(30) Foreign Application Priority Data
Nov. 15, 2012   (DE) .................. 10 2012 022 341

(51) Int. Cl.
*B60K 15/035* (2006.01)
*F02M 25/08* (2006.01)

(52) U.S. Cl.
CPC ... *B60K 15/03504* (2013.01); *F02M 25/0872* (2013.01); *B60K 15/03519* (2013.01);
(Continued)

(58) Field of Classification Search
CPC ........ B60K 15/03519; B60K 15/03504; B60K 2015/03514; B60K 2015/03509;
(Continued)

(56) References Cited

U.S. PATENT DOCUMENTS 5,404,906 A    4/1995  Aoshima et al.
6,497,335 B2  12/2002  Low et al.
(Continued)

FOREIGN PATENT DOCUMENTS

CN    102186692    9/2011
CN    102712249    10/2012
(Continued)

OTHER PUBLICATIONS

English language PCT International Search Report mailed Feb. 11, 2014, received in corresponding PCT Application No. PCT/EP13/73811, 2 pgs.
(Continued)

*Primary Examiner* — Atif Chaudry
(74) *Attorney, Agent, or Firm* — Grossman Tucker Perreault & Pfleger, PLLC

(57) ABSTRACT

The invention relates to a liquid/vapor separator (1) for a fuel tank for motor vehicles, comprising a housing (2) having a droplet collecting space (9) for fuel in vapor form. The housing (2) is provided with a connection cross section (4) which, in the installed position, opens into a space surrounded by a filler pipe of the motor vehicle. The liquid/vapor separator (1) comprises at least one first connection (6) for a refueling vent line of the fuel tank, said connection opening into the droplet collecting space (9), a second connection for a service vent line of the fuel tank, and a third connection (8) for a vent line leading to a fuel vapor filter. The liquid/vapor separator (1) according to the invention furthermore comprises at least one valve, which closes at least a service vent path (12) from the second connection to the fuel vapor filter during refueling of the motor vehicle, wherein the service vent path (12) is routed as a channel bypassing the droplet collecting space (9) into the connection cross section (4) of the housing (2).

13 Claims, 4 Drawing Sheets

Figure 2:
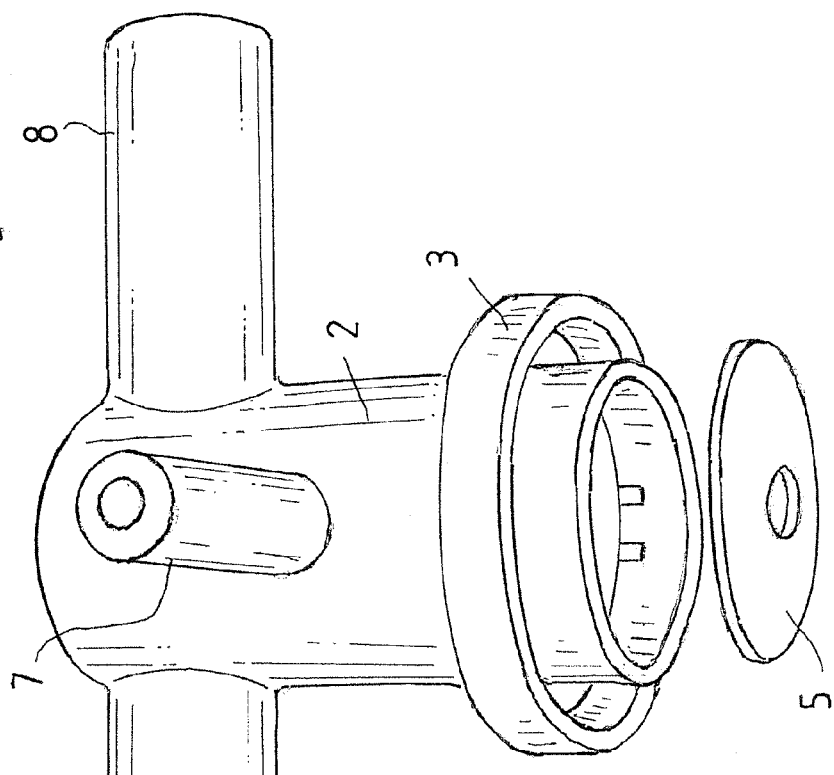

(52) U.S. Cl.
CPC .............. *B60K 2015/03509* (2013.01); *B60K 2015/03514* (2013.01); *B60K 2015/03552* (2013.01); *Y10T 137/86332* (2015.04)

(58) Field of Classification Search
CPC ...... B60K 2015/03552; F02M 25/0872; Y10T 137/86332
See application file for complete search history.

(56) References Cited

U.S. PATENT DOCUMENTS

| | | |
|---|---|---|
| 6,732,759 B2 | 5/2004 | Romanek et al. |
| 7,694,665 B2 | 4/2010 | Ehrman et al. |
| 8,813,781 B2 | 8/2014 | Nickel et al. |
| 8,826,930 B2 | 9/2014 | Devulder et al. |
| 8,960,473 B2 | 2/2015 | Grun et al. |
| 2009/0025822 A1 | 1/2009 | Rittershofer |
| 2012/0186562 A1 | 7/2012 | Achor |

FOREIGN PATENT DOCUMENTS

| | | | |
|---|---|---|---|
| CN | 103142286 | 6/2013 | |
| DE | 102006004630 A1 * | 8/2007 | ....... B60K 15/03519 |

OTHER PUBLICATIONS

English language PCT Written Opinion mailed Feb. 11, 2014, received in corresponding PCT Application No. PCT/EP13/73811, 4 pgs.

* cited by examiner

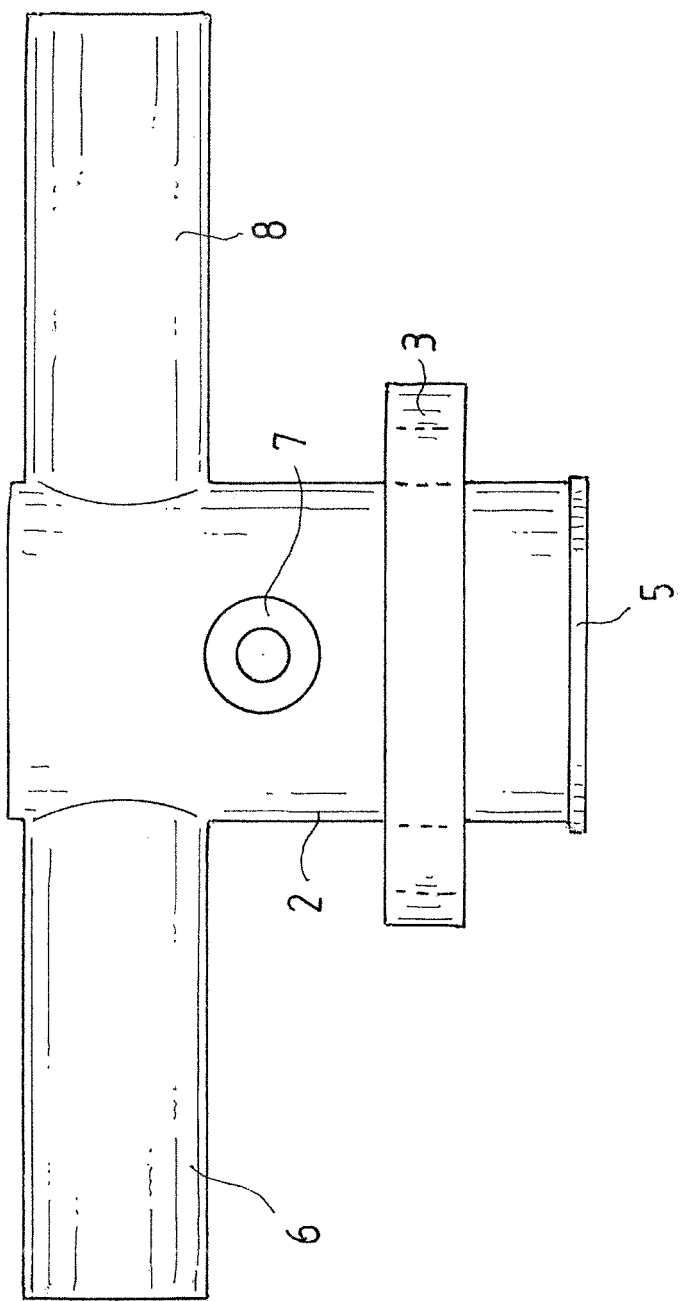

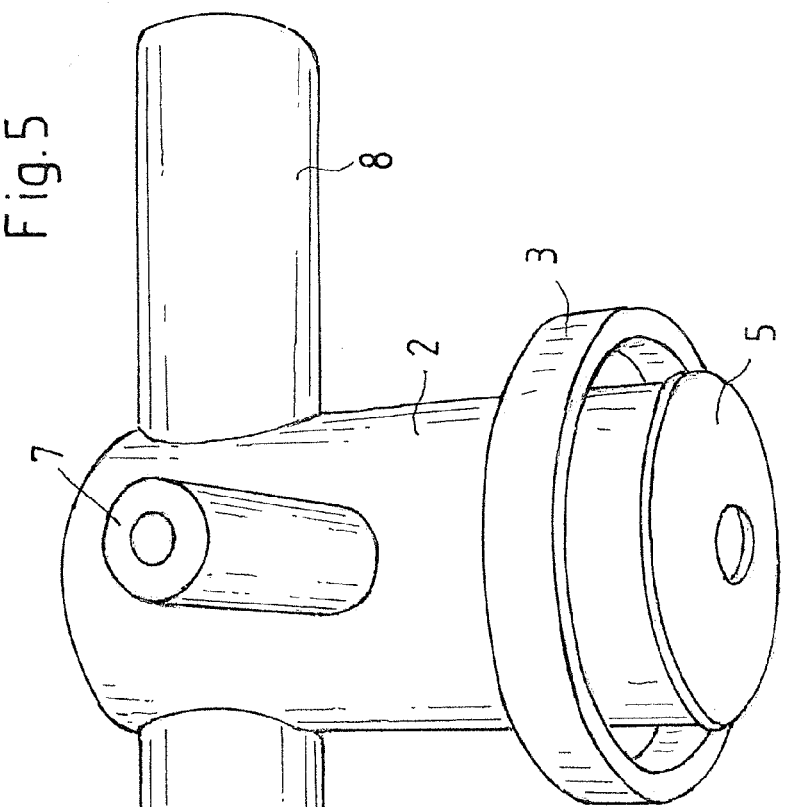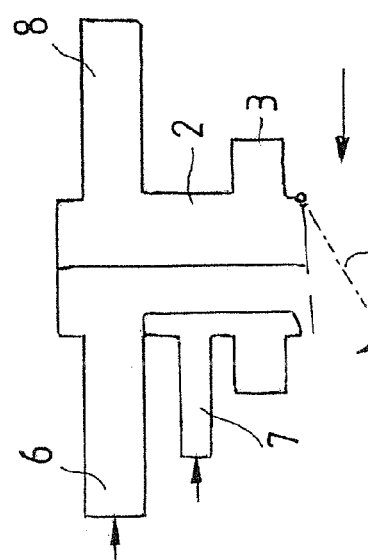

LIQUID/VAPOR SEPARATOR

The invention relates to a liquid/vapor separator for a fuel tank for motor vehicles.

A liquid/vapor separator of this kind is known from DE 10 2008 061 264 A1, for example. The vapor separator is connected to the filler head of a filler pipe of a fuel tank and comprises a valve which can be operated by initiating a refueling process. In a first operating position, the valve closes a refueling vent path from a refueling vent line connected thereto into the refueling channel surrounded by the filler pipe, such that all of the gas volume which arises during the refueling of the tank is passed via a fuel vapor filter arranged downstream of the refueling vent line. The refueling vent line is designed as a common vent line for refuel and service venting of the tank. The service vent valves arranged in the tank and a refueling vent valve are interconnected in such a way that it is necessary either to provide the refueling vent valves with a pressure holding function or to make them electrically switchable, for example, in order to ensure the function of the refueling vent valve. During times when there is no refueling, i.e. while traveling and while the vehicle is stationary, the fuel tank is generally vented via the service vent valves. The refueling vent valve is designed either as a float-operated valve or as an immersion tube (hydraulic valve) and is supposed to respond in such a way that refueling is switched off early enough to ensure that a compensating volume (gas collecting space) which cannot be filled remains in the tank.

When the service vent valves and a refueling vent valve are connected to a vent line, as described in DE 10 008 061 264 A1, the abovementioned measures must therefore be employed to ensure that no venting takes place via the service vent valves when the refueling vent valve responds.

Designing the service vent valves as pressure holding valves is expensive and, furthermore, pressure holding valves are fault prone. Each valve with moving valve bodies represents a potential source of trouble when refueling the motor vehicle.

A liquid/vapor separator for a fuel system for a motor vehicle is known from DE 20 2008 001 586 U1, for example. This separator likewise comprises a housing which can be connected to the filler pipe of a fuel tank and has an inlet opening for connection to a fuel tank valve (refueling vent valve) and an outlet opening for connecting a fuel vapor treatment device (fuel vapor filter). A changeover valve having a spring-loaded tappet is arranged in the housing, and said valve is relatively expensive.

In a manner similar to that in the above-described solution according to DE 10 2008 061 264 A1, the service vent line or a service vent valve is connected to the refueling vent line.

In a simpler version of the liquid/vapor separator according to DE 20 2008 001 586 U1, the filler pipe of the fuel tank is provided with a flap valve which is normally closed and which closes a flow path between the filler neck and the filler opening. When the fuel pump nozzle is introduced into the filler opening of the fuel tank, it restricts the cross-sectional area of a blowoff opening in the housing of the liquid/vapor separator, with the result that the fluid flow circulation and hence the fluid flow toward the fuel vapor filter is hindered by the resulting nozzle effect.

In the solution according to DE 20 2008 001 586 U1 too, the service vent valves must be embodied with a pressure holding function in order to ensure effective switching off of refueling.

DE 10 2006 004 630 A1 discloses a fuel tank for a motor vehicle having a filler neck surrounding a refueling channel and having service and refueling vent lines, which are connected to a filler head of the filler neck, wherein the filler head has at least one changeover valve, which, in a first operating position, opens a flow path from the refueling vent line to a fuel vapor filter and blocks a connection of the service vent line to the refueling channel and, in a second operating position, opens the connection of the service vent line to the refueling channel and blocks the flow path from the refueling vent line to the fuel vapor filter. Both the service vent line and the refueling vent line are connected directly to a valve housing in which an operating tappet having a first closure element and a second closure element is movably mounted, wherein the operating tappet opens the flow path of the refueling vent line and closes the flow path of the service vent line during refueling, owing to the fuel pump nozzle. This arrangement is relatively complex because a spring-loaded valve body has to be provided to implement it, and said valve body has to be appropriately mounted within the valve housing.

It is therefore the underlying object of the invention to provide a liquid/vapor separator of the abovementioned type which allows effective droplet separation during refueling while simultaneously allowing the service venting of the tank to be of simple design.

The object is achieved by a liquid/vapor separator for a fuel tank for motor vehicles, comprising a housing having means for separating fuel in vapor form, wherein the housing communicates in the installed position with a connection opening in a connection volume as an expansion tank, a bubble section or as a space enclosed by a filler pipe of the motor vehicle, having a first connection for a refueling vent line of the fuel tank, said line opening into the housing, a second connection for a service vent line of the fuel tank, a third connection for a vent line leading to a fuel vapor filter, having at least one refueling vent path from the first connection to the third connection, having at least one service vent path from the second connection to the third connection and at least one valve, which closes at least the service vent path from the second connection to the third connection during refueling of the motor vehicle, wherein the service vent path and the refueling vent path open via a common connection cross section into the connection opening, and wherein the valve has at least one valve body which closes the entire connection cross section in one operating position.

By means of a relatively simple design of this kind of the liquid/vapor separator according to the invention, it is possible to make the valve particularly simple, it being possible, for example, for the valve to be designed as a simple flap valve which is actuated by the fuel pump nozzle during refueling.

In an expedient variant of the liquid/vapor separator according to the invention, provision is made for the housing to comprise a droplet collecting space and for the service vent path to open as the channel bypassing the droplet collecting space directly into the connection opening of the connection volume.

In an expedient variant of the liquid/vapor separator according to the invention, the service vent path or a service vent channel opens directly into the connection opening in the housing in such a way that the mouth is in alignment with the mouth of the connection opening.

The valve can be designed in such a way that, when actuated, it simultaneously closes a refueling vent path from the first connection to the third connection, with the result that the gas volume displaced by the inflowing liquid during refueling can flow off into the connection volume in order, for example, in the process of refueling to be sucked off at the fuel pump nozzle during refueling.

In this case, it is advantageous if the valve has at least one opening into the connection volume, said opening defining a refueling vent path from the first connection into the connection volume.

The invention can be described to the effect that, according to the invention, provision is made for essentially all of the flow paths that are to be opened or freed by the valve to open into the connection volume in the connection opening leading to said volume, making it to relatively simple matter to perform selective closure or opening of one flow path or the other by means of a valve flap or a linear motion valve body within the connection volume.

The liquid/vapor separator according to the invention advantageously comprises three paths, which can be selected by means of just two operating positions of a closure body, e.g. in the form of a valve flap.

The mouths of the flow paths can open into the connection volume on radii which are in part arranged concentrically with one another, for example, making it possible, for example, to design the valve as a flap valve with a plurality of sealing elements or sealing strips arranged concentrically with one another.

In a particularly advantageous variant of the liquid/vapor separator according to the invention, provision is made for the valve to be designed as a pivotably mounted valve flap which is mounted on the housing and/or within a space surrounded by a filler pipe in such a way that, during refueling, it can be moved by the fuel pump nozzle into a position in which it closes at least parts of the connection opening.

The valve flap does not necessarily have to be an integral part of the housing; on the contrary, it can also be arranged pivotably in the filler pipe.

Instead of a valve flap it is also possible to provide a linear motion valve body in the form of a tappet or ram or of a ball or of a cylinder which is guided within the filler pipe, for example, in such a way that it can be moved by the fuel pump nozzle. This tappet can be provided on one end with a corresponding topography of complementary design to the structure of the flow path opening into the connection opening.

In an expedient embodiment of the liquid/vapor separator according to the invention, the valve flap is designed as a carrier for at least one first sealing element which closes the service vent path when the valve flap is actuated.

The valve flap can have a second sealing element, which closes the refueling vent path to the third connection when the valve flap is actuated.

In an expedient variant of the liquid/vapor separator according to the invention, the valve flap has at least one recirculation opening, which can be closed by means of a check valve.

This check valve can be designed as a simple mushroom valve with a sealing body made of elastomeric material, for example. In the case where the fuel pump nozzle fails, the check valve serves to close the refueling vent path against any ingress of liquid fuel.

It is expedient if the valve flap is held under spring load in the open position. For this purpose, a simple helical compression spring which is wound around the pivot of the valve flap can be provided, for example.

It is expedient if the housing of the liquid/vapor separator according to the invention comprises at least one, preferably two, droplet precipitation walls provided between the first connection and the third connection in the condensation space or in the refueling vent path.

In one variant of the liquid/vapor separator according to the invention, provision is made for the housing to define a refueling vent path from the first connection to the third connection, said path bypassing the connection opening when the valve is closed. This variant is advantageous particularly for refueling systems for the North American market, in which the refueling vent volume flow is discharged to the atmosphere exclusively via the fuel vapor filter after complete cleaning. In this case, the valve is designed in such a way that, when actuated, it closes the service vent path and the refueling vent path into the filler pipe.

Figure 1:
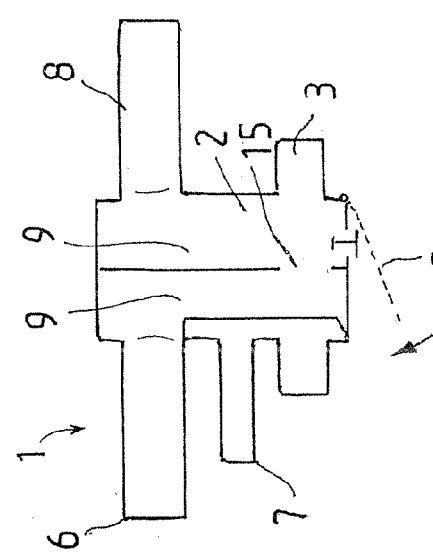
Figure 4:
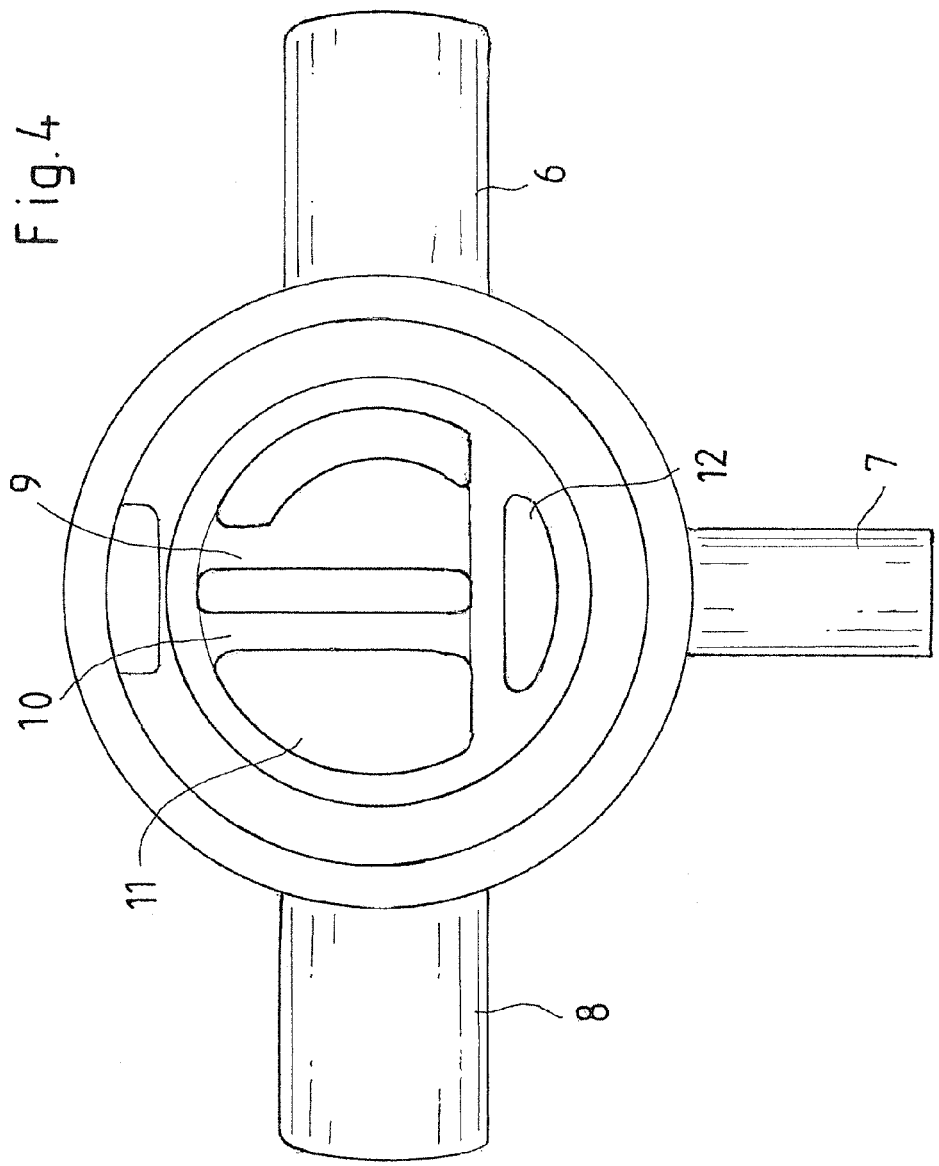

An illustrative embodiment of the invention is explained below with reference to the attached drawings, in which:

FIG. 1: shows a schematic section through a liquid/vapor separator according to the invention, FIG. 2: shows a perspective view of a specific embodiment of the liquid/vapor separator according to the invention, FIG. 3: shows a view of the liquid/vapor separator from FIG. 2 in the direction of arrow III in FIG. 2, FIG. 4: shows a bottom view of the liquid/vapor separator looking toward the connection opening, FIG. 5: shows a side view corresponding to FIG. 4 in the actuated state of the valve (partially in section), and FIG. 6: shows a liquid/vapor separator according to a second illustrative embodiment of the invention in a schematic view.

The liquid/vapor separator 1 according to the invention comprises a housing 2, which is provided with an encircling weld-on flange 3, which is welded onto the outside of a connection volume (not shown) of a fuel tank made of thermoplastic in the installed position of the liquid/vapor separator 1. In the present case, a space surrounded by a filler pipe of the motor vehicle is provided as a connection volume. As an alternative, a bubble section, an expansion volume or the like can be provided as a connection volume.

In the illustrative embodiment of the invention which is shown, the weld-on flange 3 is arranged on the housing 2 of the liquid/vapor separator 1 in such a way that the housing 2 passes through a connection opening in the filler pipe, and a valve flap 5 provided on the housing extends into the refueling channel of the filler pipe, such that said flap can be actuated by a fuel pump nozzle inserted into the refueling channel of the filler pipe.

In the drawing, the valve flap 5 is only shown indicatively, its attachment by a joint to the housing or to parts of the connection volume being omitted for reasons of simplification. This is intended to illustrate that it is equally possible for the valve body shown to be capable of linear movement in a corresponding valve body guide. Direct actuation of the valve body by means of a fuel pump nozzle is not necessarily required; on the contrary, it is also possible, for example, for the valve body to be indirectly actuable by an electric motor or by means of mechanical actuating elements in the case of refueling.

The housing 2 of the liquid/vapor separator 1 comprises a first connection 6 for a refueling vent line of the fuel tank, a second connection 7 for a service vent line of the fuel tank and a third connection 8 for a vent line leading to a fuel vapor filter of the fuel tank. The housing 2 furthermore encloses a droplet collecting space 9, which in the simplest case accommodates one or more droplet precipitation walls 10, which extend in the flow path between the first connection 6 and the second connection 7. Instead of droplet precipitation walls 10 extending preferentially approximately in a straight line, it is also possible for other, labyrinth-type fittings to be accommodated by the housing 2. The first, second and third connections 6, 7, 8 are each designed as connection nipples with a "Christmas tree" profile (not shown), which serves to receive a flexible line which is squeezed on.

From the first connection 6 to the third connection 8, the housing 2 defines a refueling vent path 11, via which the gas volume flow displaced by the liquid during refueling of the fuel tank is discharged to the atmosphere after being cleaned via the fuel vapor filter (not shown). Since the fuel vapor filter is generally filled with granules that have an adsorptive action, e.g. with activated carbon, which loses effectiveness if wetted by liquid fuel or by liquid hydrocarbons, it is necessary to precipitate or condense the droplets entrained by the refueling vent flow in the liquid/vapor separator 1, thus allowing said droplets to pass back into the refueling channel of the filler pipe via the connection opening. For this purpose the droplet precipitation walls 10 mentioned are provided in the refueling vent path 11 from the first connection 6 to the third connection 8. Both the first connection 6 and the third connection 8 are connected directly to the droplet collecting space 9.

As can be seen, for example, from the diagrammatic illustration in FIG. 1, the third connection 8 opens directly into the connection opening and thus, in the installed position of the liquid/vapor separator 1, into the space enclosed by the filler pipe. The service vent path 12, which is routed from the second connection 7 into the connection opening, completely bypasses the droplet collecting space 9 or is not connected directly to the droplet collecting space 9.

If the valve flap 5 is moved into the closed position during the refueling process, even the service vent path 12 from the second connection 7 into the connection opening is closed, as will be explained below.

The valve flap 5 can, for example, be provided with an elastomeric sealing washer which closes the entire connection cross section 4 of the housing 2 in the closed position, with the result that both the service vent path 12 and the refueling vent path 11 into the connection volume, e.g. into the space enclosed by the filler pipe, are closed. This is the case at least with a variant of a refueling vent system in which all the gas volume flow displaced by the liquid volume flow is discharged to the atmosphere after cleaning via the fuel vapor filter during the refueling of the motor vehicle. In this case, only a small part of the gas volume flow is to be recirculated through the filler pipe into the fuel tank, while a larger part of this gas volume flow is passed through from the first connection 6 to the third connection 8 via a bypass opening 15 within the housing 2.

In a refueling vent system in which the refueling vent flow is largely sucked off at the fuel pump nozzle, as is the predominant practice in Central Europe, the liquid/vapor separator 1 according to the invention can be designed in such a way that the valve flap 5 blocks only the refueling vent path to the third connection 8 while leaving free the refueling vent path 11 from the first connection 6 to the connection opening. In this case, no bypass opening 15 would be provided in the housing 2.

Such a variant of the liquid/vapor separator 1 according to the invention is illustrated in a greatly simplified form in FIG. 10.

Also provided in the valve flap 5 is a recirculation opening, which can be closed by means of a check valve. The check valve serves to seal off the housing 2 from liquid fuel if the fuel pump nozzle fails, for instance.

The liquid/vapor separator 1 according to the invention can be formed by a housing made of POM (polyoxymethylene) with a weld-on flange 3 made of polyethylene. The liquid/vapor separator 1 according to the invention can have been obtained by injection molding in the two-component injection molding process, for example.

LIST OF REFERENCE SIGNS 1 liquid/vapor separator
2 housing
3 weld-on flange
4 connection cross section
5 valve flap
6 first connection
7 second connection
8 third connection
9 droplet collecting space
10 droplet precipitation walls
11 refueling vent path
12 service vent path

What is claimed is:

1. A liquid/vapor separator for a fuel tank for a motor vehicle, comprising:
   a housing having means for separating fuel in vapor form, wherein the housing communicates with a connection opening in a connection volume, said connection volume being an expansion tank, a bubble section or a space enclosed by a filler pipe of the motor vehicle,
   the housing having a first connection for a refueling vent line of the fuel tank, said connection opening into the housing, a second connection for a service vent line of the fuel tank, and a third connection for a vent line leading to a fuel vapor filter,
   the housing having at least one refueling vent path from the first connection to the third connection,
   the housing having at least one service vent path from the second connection to the third connection and at least one valve, which closes at least the service vent path from the second connection to the third connection during refueling of the motor vehicle,
   the housing having a droplet collecting space and, in an installed position, the valve is arranged within the connection volume,
   wherein the service vent path and the refueling vent path open via a common connection cross section of the connection opening into the connection volume,
   wherein the valve has a valve body which closes the entire connection cross section in one operating position, and
   wherein the service vent path is routed as a channel bypassing the droplet collecting space directly into the connection opening of the connection volume.

2. The liquid/vapor separator as claimed in claim 1, wherein the valve is configured such that, when actuated, the valve closes the service vent path and the refueling vent path from the first connection to the third connection.

3. The liquid/vapor separator as claimed in claim 1, wherein the valve has at least one opening into the connection volume, said opening defining a refueling vent path from the first connection into the connection volume.

4. The liquid/vapor separator as claimed in claim 1, wherein the valve is configured as a pivotably mounted valve flap mounted on the housing and/or within the connection volume such that, during refueling, the valve flap is movable by a fuel pump nozzle into a position in which the valve flap closes the connection cross section.

5. The liquid/vapor separator as claimed in claim 4, wherein the valve flap is configured as a carrier for at least one sealing element which closes the service vent path when the valve flap is actuated.

6. The liquid/vapor separator as claimed in claim 5, wherein the valve flap has a second sealing element, which closes the refueling vent path to the third connection when the valve flap is actuated.

7. The liquid/vapor separator as claimed in claim 4, wherein the valve flap has at least one recirculation opening.

8. The liquid/vapor separator as claimed in claim 7, wherein the at least one recirculation opening is closeable.

9. The liquid/vapor separator as claimed in claim 8, wherein the at least one recirculation opening is closable by a check valve.

10. The liquid/vapor separator as claimed in claim 4, wherein the valve flap is held under spring load in an open position.

11. The liquid/vapor separator as claimed in claim 1, wherein the housing comprises at least one droplet precipitation wall provided between the first connection and the third connection in the refueling vent path.

12. The liquid/vapor separator as claimed in claim 11, wherein the housing comprises two droplet precipitation walls provided between the first connection and the third connection in the refueling vent path.

13. The liquid/vapor separator as claimed in claim 1, wherein the refueling vent path bypasses the connection cross section when the valve is closed.

* * * * *